Feb. 28, 1961 H. H. PLATT ET AL 2,972,934
CONTINUOUS HOIST FOR AMMUNITION
Filed May 11, 1951 5 Sheets-Sheet 3

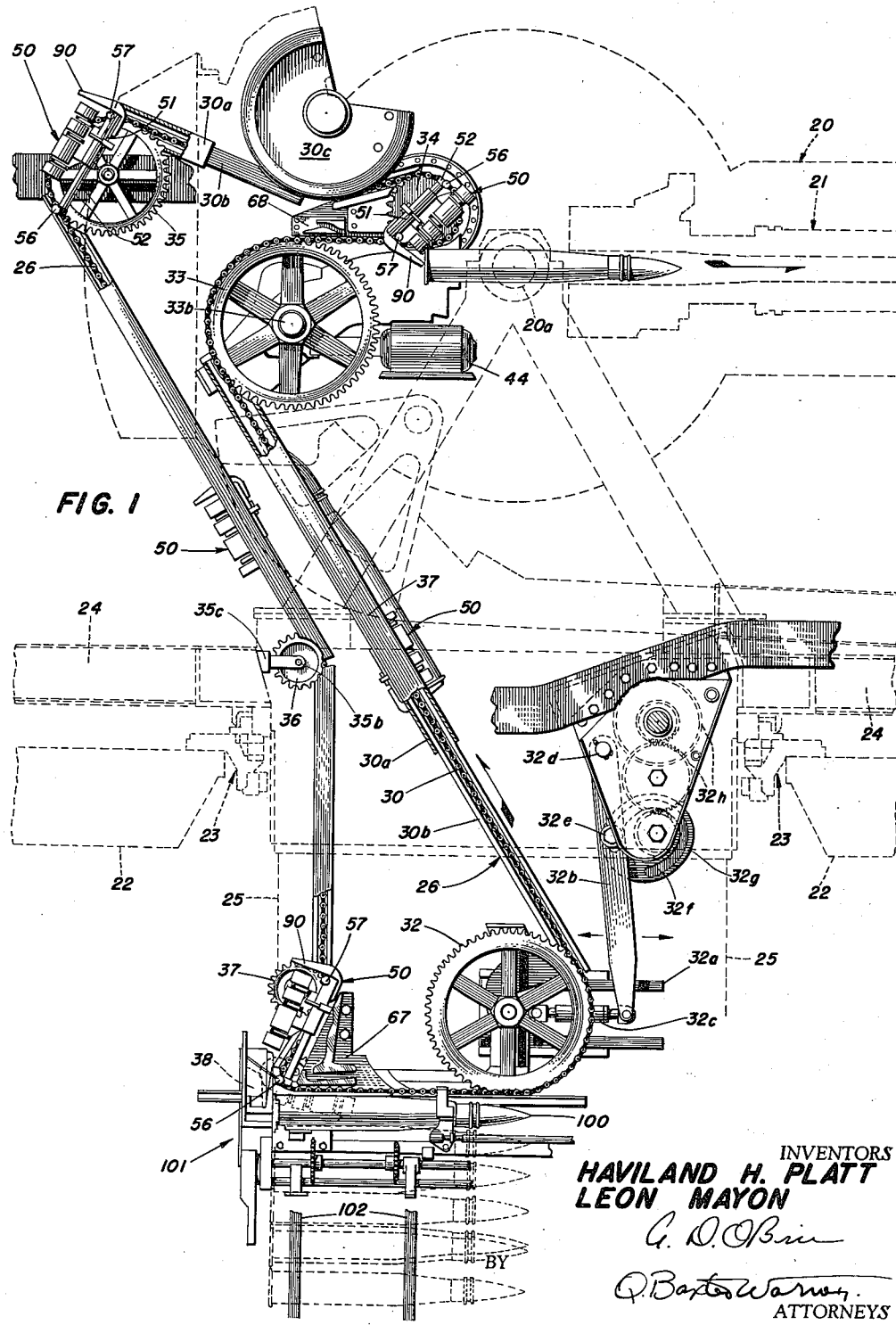

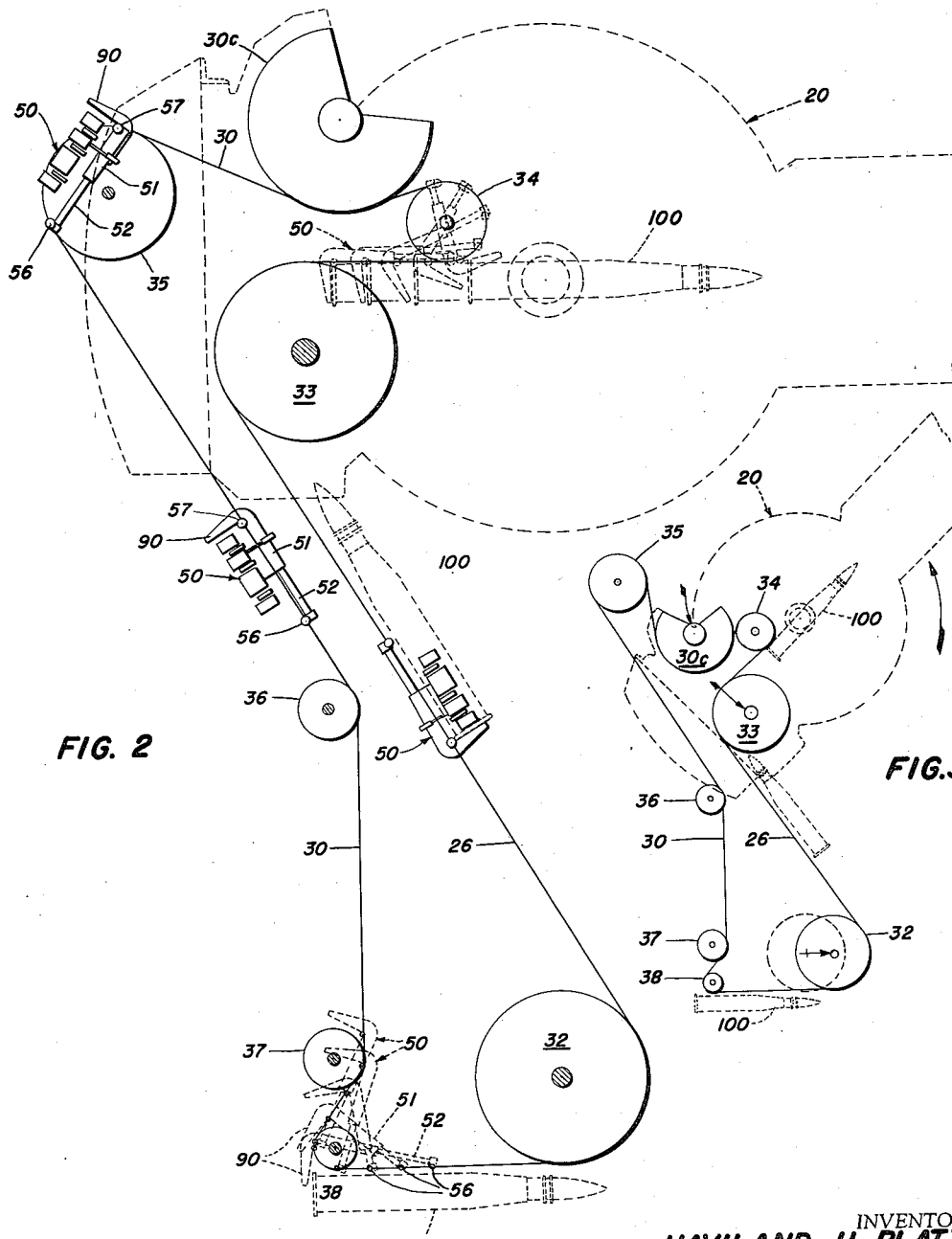

INVENTORS
HAVILAND H. PLATT
LEON MAYON
BY
ATTORNEYS

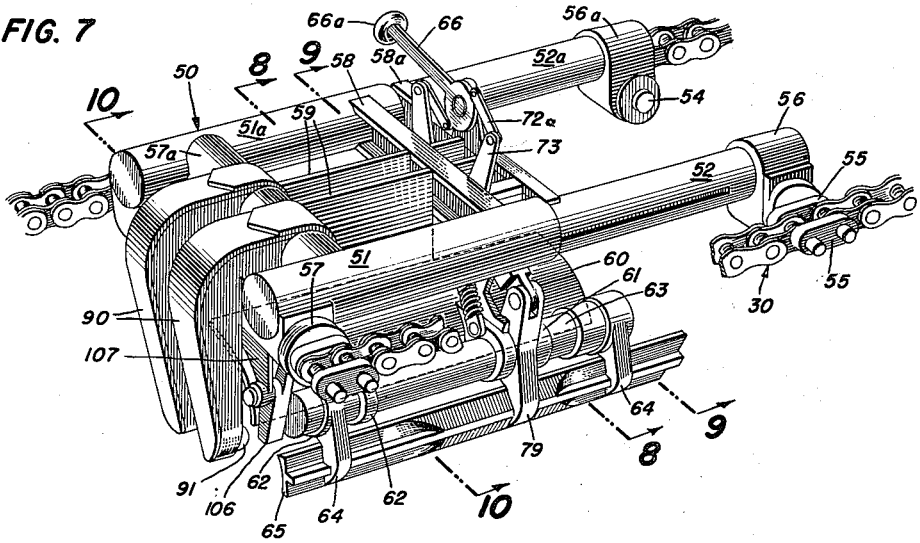
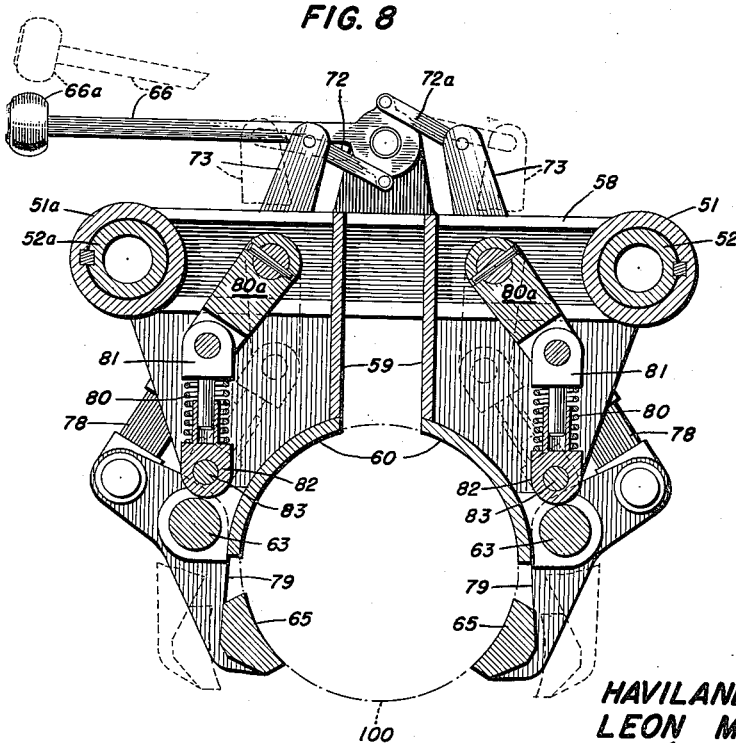

Feb. 28, 1961 H. H. PLATT ET AL 2,972,934
CONTINUOUS HOIST FOR AMMUNITION
Filed May 11, 1951 5 Sheets-Sheet 5

INVENTORS
HAVILAND H. PLATT
LEON MAYON
BY
ATTORNEYS

United States Patent Office 2,972,934
Patented Feb. 28, 1961

2,972,934
CONTINUOUS HOIST FOR AMMUNITION

Haviland H. Platt, New York, N.Y., and Leon Mayon, Philadelphia, Pa., assignors, by direct and mesne assignments, to the United States of America as represented by the Secretary of the Navy Filed May 11, 1951, Ser. No. 225,742

7 Claims. (Cl. 89—46)

This invention relates to conveyors and more particularly to conveyors designed to operate continuously at relatively high rates of speed, and which can pick up an object without impact at one station, transfer it to a new station and release or catapult the object at the new station.

Heretofore, conveyor mechanisms for moving objects from one station to another have usually comprised endless chains having flights thereon or reciprocable hoist bars having object engaging members thereon. For transporting objects which require careful handling, such as ammunition, it has heretofore been necessary to stop the conveyor at the pick-up and the delivery stations in order that the objects may be loaded and unloaded by means separate from the conveyor. To start, stop, accelerate, and decelerate such conveyors after every loading and unloading operation requires complicated and expensive equipment and control systems and a large number of handlers or operators are needed to move the object onto and off of the conveyors. Such conveyors are particularly unsuited for transporting large caliber ammunition to modern rapid fire guns because the rate of fire of such guns is then limited by the ability of the handlers to transfer the ammunition from the ammunition storage space to the conveyor and from the conveyor to the gun breech.

The present invention provides a novel conveyor which is particularly adapted for use with modern automatic rapid fire guns. However it is not limited to such use and the basic method of operation may be employed whenever there is a requirement for a simple, efficient and rapid conveyor of this character. Broadly, the conveyor comprises a band which may comprise a pair of endless parallel roller chains supported by several pairs of spaced individually mounted sprockets and guided between the sprockets by suitable chain guides. A constant speed motor acts on one of the pairs of sprockets to drive the conveyor band at a substantially constant speed and a plurality of cradles having object engaging arms are carried between the chains.

One of the pairs of sprockets is positioned adjacent a loading station and the cradles are so mounted on the band that when a cradle passes around the loading station sprocket the band changes direction rather abruptly and the cradle decelerates until an object engaging foot at the after end of the cradle has substantially no motion in the direction of band travel whereby the object may be embraced by the jaws of the cradle and the cradle foot engages the base of the projectile with substantially no impact. As a cradle completes its travel around the loading station sprocket it accelerates smoothly to band speed, carrying with it the object. A second pair of sprockets is located adjacent the delivery station and these also change the direction of band movement to rotate the cradle about its transverse axis thus causing the cradle foot to move a large distance for a small movement of the cradle. As the cradle passes around the delivery station sprocket the gripper jaws are opened and the object is catapulted in free flight to the point of delivery at a speed which may be even greater than that of the band. The position of the delivery sprockets may be varied so that the direction in which the object is propelled may be varied as desired, as for example may be required by movement of the gun breech as the gun moves in elevation. Thus the conveyor is particularly adapted for delivering ammunition directly into the breech of a gun, while it is moving in elevation, without the use of intermediate ammunition handlers or mechanisms for transferring the ammunition between the conveyor and the gun, as has been the practice heretofore.

Hence one object of the present invention is to provide a novel continuous band conveyor which picks up, carries, and releases objects without interruption of the continuous band movement.

Another object is to provide article engaging means which decelerate substantially to a stop for the purpose of engagement with an object and thereafter accelerate smoothly to conveyor speed without interruption of conveyor operation.

Still another object is to provide means for releasing the object at the delivery station and imparting thereto a smooth acceleration to a speed equal to or higher than the speed of the conveyor.

Another object of the present invention is to provide a continuously operating conveyor which is particularly adapted to the rapid transfer of ammunition from a magazine to a gun breech without the use of ammunition handlers or auxiliary ammunition handling equipment whereby large caliber guns may be rendered fully automatic in operation.

Other objects and their attendant advantages will become apparent when the following detailed description is read in conjunction with the accompanying drawings wherein:

Fig. 1 is a partly schematic side elevation of one embodiment of the present invention with parts thereof broken away;

Fig. 2 is a schematic side elevation view showing in a series of overlapping instantaneous views the path of travel of the cradles;

Fig. 3 is a reduced schematic side elevation view showing one method wherein an object may be transferred from the conveyor to a movable delivery station;

Fig. 7 is an enlarged detailed perspective view taken from the right rear, of one form of object grasping cradle which may be employed with the conveyor of the present invention;

Fig. 8 is an enlarged vertical cross-sectional view through the cradle taken along a line substantially corresponding to line 8—8 of Fig. 7;

Figure 4:
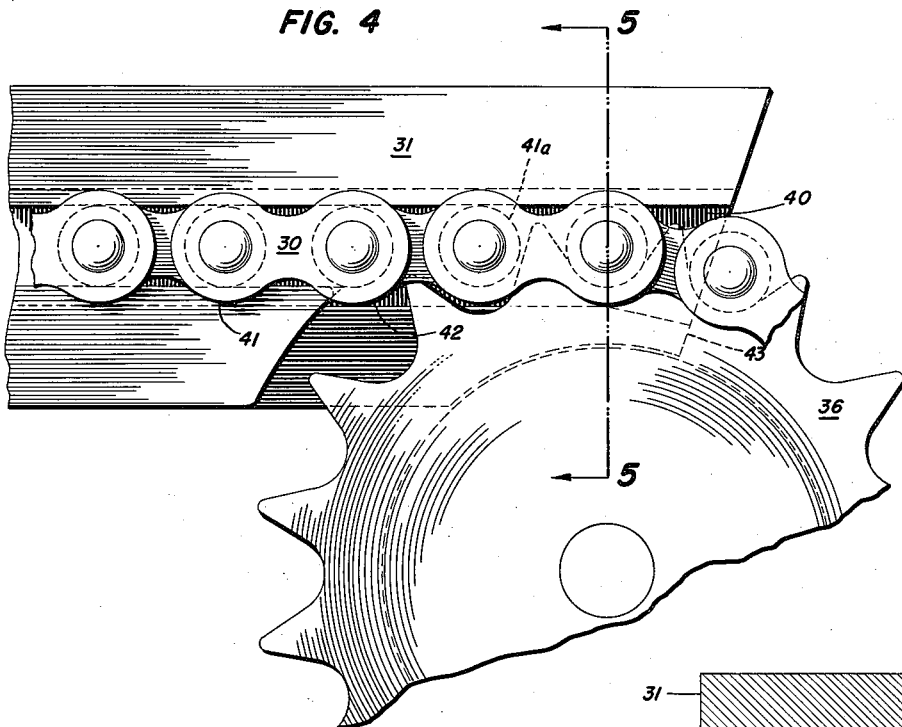
Fig. 4 is a greatly enlarged detailed side elevation showing a method of leading a conveyor chain between typical conveyor sprockets and a chain guide.

Referring to the drawings in detail, in Fig. 1 there is shown in side elevation by phantom lines a gun mount indicated by reference character 20. The breach 21 of a gun barrel is received in this mount and the entire assembly is rotatably mounted on conventional train bearing and drive apparatus 23 which may project through an opening in the ship's deck or other support structure 22. Spaced above the deck 22 and secured to the mount 20 for rotation therewith is a conventional fire platform 24 on which gun crews or observers may stand.

Depending from the mount into the interior of the ship is a cylindrical housing member 25 which rotates with the gun mount and carries a conveyor indicated generally at 26 which serves to hoist rounds of ammunition from the interior of the ship to the gun. With reference to Figs. 1, 4, and 7, the conveyor 26 comprises a pair of parallel spaced endless roller chains 30 guided in spaced parallel movement by chain guides 31 and supported at intervals on a plurality of pairs of spaced sprocket wheels 32, 33, 34, 35, 36, 37, and 38. The exact number of pairs of sprocket wheels, of course, may vary: a sufficient number being provided to conform the path of the conveyor with the structure in which the conveyor is used. The pair of sprockets 33 may be the drive sprockets and are preferably mounted on the elevating portion of the gun mount and driven by a constant speed motor 44 likewise mounted on the gun mount. The remaining pairs of sprockets are idlers, and as shown in the end view, Fig. 6, each is journaled on its respective stub shaft 35b mounted on its bracket 35c conveniently secured to the elevating portion of the gun mount. By spacing the sprockets apart in this manner, the object carrying cradles 50 which are pivotally supported on and depend between the chains may readily negotiate sprockets of small diameter without being obstructed by a common axle interconnecting them. The drive sprockets 33 however, are preferably mounted on a common drive axle 33b (Fig. 1) so that both conveyor chains 30 will be driven at the same speed. The large diameter of the sprockets 33 enables the cradles with an object to clear this axle without interference. The chain guide between sprockets 32 and 33 is preferably telescopically arranged, and may comprise telescoping channels 30a and 30b of substantially "C" cross section, so that when the gun elevates the guide automatically adjusts its length.

Figure 6:
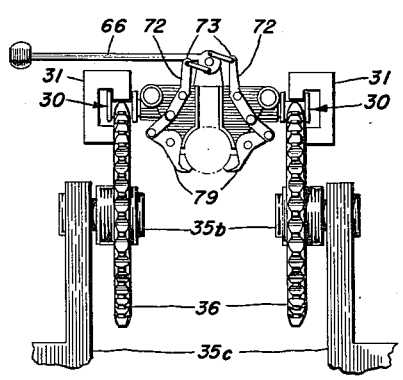
Fig. 6 is a vertical elevation looking at a cradle and sprocket pairs from the rear.
Figure 5:
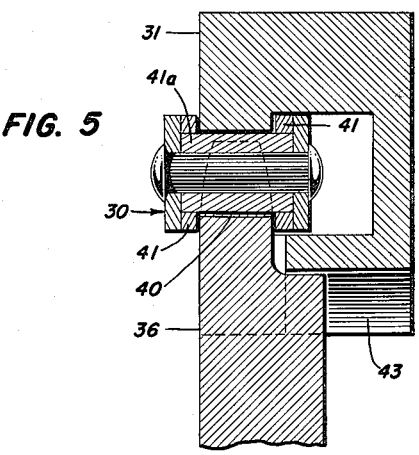
Fig. 5 is a vertical cross-sectional view, partly broken away, taken on a line substantially corresponding to line 5—5 of Fig. 4.
Figure 9:
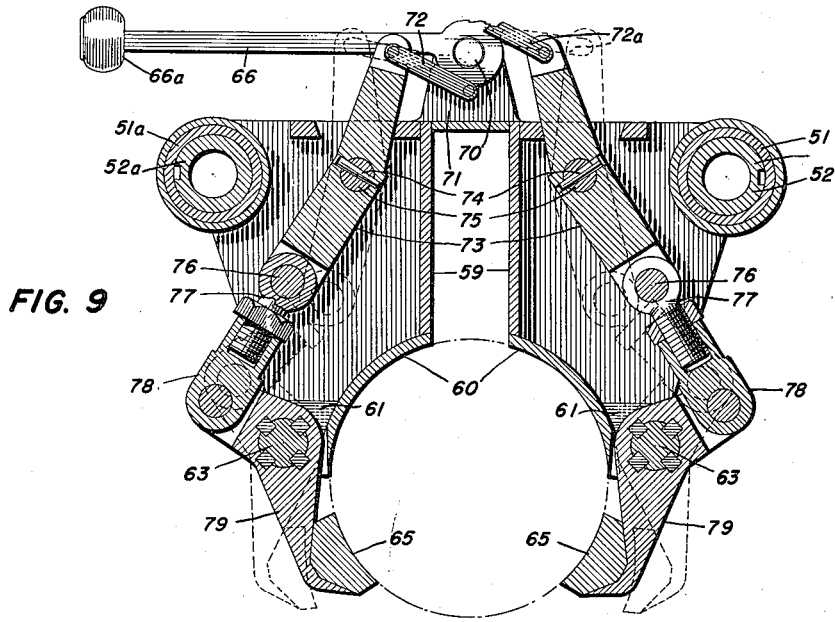
Fig. 9 is an enlarged vertical cross-sectional view taken along a line substantially corresponding to line 9—9 of Fig. 7.
Figure 10:
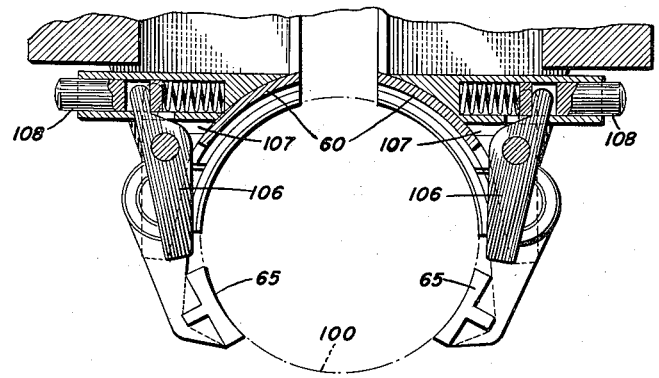
Fig. 10 is an enlarged vertical cross-sectional view taken along a line substantially corresponding to line 10—10 of Fig. 7.

As shown in Figs. 4, 5, and 6, the slots 40 of the chain guides are slightly greater than the diameter of the chain rollers 41a so that the chains are retained in place by the opposed pin link plates 41 which ride on opposite sides of the slot flanges. At the point where the chain 30 runs off the chain guides and on to a sprocket there exists a gap 42 (Fig. 4) over which the chain rollers are not supported by either the guide or the sprocket. Extensions 43, therefore, may be provided to extend beneath outer pin link plates and alongside a sprocket 36 to its point of tangency therewith and guide the chains over the gap onto, or off of, the sprocket.

Since the gun is movable in elevation the total length of the conveyor path varies in accordance with the elevational position of the gun and means must therefore be provided to take up the resulting slack in the chain. In the present embodiment this is accomplished by the method illustrated in Fig. 1 wherein sprocket 32 is journaled in a crosshead slidably mounted on rails 32a for movement in and out to maintain a constant tension on the chain. This movement may be accomplished through an arm 32b which has a fixed pivot 32d at its upper end and is connected at its lower end to the sprocket mounting through a suitable link 32c. A cam pin 32e located intermediate the ends of the arm rides in a cam slot 32f in a cam plate 32g which plate is rotated through a suitable gear train 32h so that it moves in timed relationship with the elevating mechanism of the gun. Thus, as schematically indicated in Fig. 3, when the gun is elevated and the length of the conveyor path between sprockets 32 and 33 is decreased the cam plate 32g is rotated to cause arm 32b to move sprocket 32 out thereby maintaining uniform chain tension.

Since the pair of sprockets 35 does not move with the gun in elevation, an arcuate guide in provided in the form of spaced flanged discs 30c providing a guide groove between their peripheral edge flanges to receive the chain. This guide is mounted on the elevating portion of the mount and confines the chain as it runs off of the sprocket 34 and onto the fixed sprocket 35, irrespective of the elevational position of the gun.

The object engaging cradles 50 are suspended between the chains at intervals and are illustrated in detail in Figs. 6 to 10 inclusive. With reference to Fig. 7, each cradle comprises a pair of spaced parallel side arms including rear outer tubes 51 and 51a and forward inner extension members 52 and 52a. In the embodiment illustrated the rear and forward portions of both arms telescope to vary the distance between the rear chain engaging brackets 57 (only one of which is shown) and the forward chain engaging brackets 56 and 56a. These brackets may be of any desired construction but in the embodiment illustrated include stub shafts 54 mounted on chain link adaptor plates 55 thus pivotally connecting the cradle arms to the conveyor chains. The spaced side arms are interconnected at the rear by a cross member 57a and at the front by forward cross members 58 and 58a. The rear cross member 57a and the front member 58 are interconnected by a pair of spaced longitudinally extending webs 59 which have welded or otherwise secured to their lower edges longitudinally disposed semi-cylindrical plates 60 shaped to receive a cylindrical object such as a projectile. To the outer surfaces of each of the plates 60 are secured pairs of brackets or bosses 61 and 62 (Fig. 7) in which are journaled shafts 63 to which are secured two gripper arms 64 which together support arcuate gripping jaws 65 one on each side of the carriage which jaws are movable between open and closed positions to engage or release a projectile.

Movement of the jaws 65 is accomplished by a cam operated arm 66 whose inner end is pivotally connected to a bracket 71 extending upwardly from the forward web 58a. Arm 66 projects to one side of the cradle to engage, through cam roller 66a, fixed cams 67 and 68 (Fig. 1) which are respectively located at the loading and delivery stations of the conveyor. Pivotally connected to opposite sides of the enlarged inner end of arm 66 are links 72 and 72a whose opposite ends are pivoted to the upper ends of operating arms 73 (Fig. 9) affixed by keys 74 to stub shafts 75 which, in turn, are rotatably supported by the webs 58 and 58a. The lower ends of these arms 73 are pivotally connected by pins 76 to the eyes of eye-bolts 77 threaded into knuckles 78 which are pivoted to the upper ends of bell cranks 79. Each bell crank is keyed to its respective shaft 63 and bears at its lower end a gripper jaw 65 which is closed when arm 66 is in the horizontal position of Fig. 9. When arm 66 is moved upwardly, by engagement of roller 66a with a suitably contoured cam surface, links 72 are moved in the direction of the arrows in Fig. 9 and the upper ends of arms 73 are moved outwardly to the position shown by dotted lines. The lower ends of arms 73 thereupon move inwardly causing bell cranks 79 to rotate shafts 63 and separate jaws 65.

To retain the jaws either in their open or closed position an overcenter toggle arrangement is provided for each jaw as illustrated in Fig. 8. Each toggle comprises an upper link arm 80a keyed to the operating arm stub shaft 75 and a lower link arm including a compressible spring and guide plunger arrangement as shown. The lower end of this arm is pivoted at 83 to the web 58. When the jaws 65 are in the closed position of Fig. 8 the knees of the toggles are urged outwardly, locking the jaws firmly about the projectile. As the jaws are moved to the open position by arm 66, the toggle knees are moved inwardly overcenter and then urged inwardly by the springs to the position shown by dotted lines, thus releasably retaining the jaws in their open position.

At the rear of the cradle are a pair of spaced downwardly directed accelerating feet 90 (Fig. 7) having pads 91 for contact with a projectile base so that a projectile being carried is supported by the gripper jaws along each side and by the accelerating feet at the rear. To prevent the projectile from sliding forwardly in the cradle, suitable hold back latches, such as those illustrated in Fig. 10, may be provided. These latches may comprise spring biased pivoted fingers 106 pivotally supported in suitable brackets 107 mounted on each of the fixed arcuate plates 60. The reduced upper ends of these latches 106 are received in an opening in the spring urged plungers 108 which plungers normally project outwardly from the frame of the cradle. These springs keep the opposite ends of the latches in engagement with the projectile flange or flange groove. As the cradles reach the loading or delivery positions the rounded outer ends of plungers 108 contact cam surfaces located adjacent those positions and are moved inwardly to pivot the lower ends of fingers 106 clear of the projectile flange.

In operation, the projectiles may be supplied to the pickup station 101 (Fig. 1) in a number of ways, one being by an endless chain arrangement wherein a chain 102 driven in timed relationship with the conveyor carries projectiles in suitable clips (not shown) to the pickup station and there holds them until the projectiles are grasped by one of the cradles. The cradles, when they pass the loading station, pick up the stationary projectiles and accelerate them smoothly to chain speed, substantially without impact or shock. This is an important feature of the present invention and is accomplished by locating the pickup sprockets 38 in such a position relative to the pickup station that, as the cradles round the sprockets 38, the feet 90, as indicated by the series of overlapping views in Fig. 2, decelerate to practically zero forward velocity and have a downward motion into place behind the projectile base. Thus the projectiles, being contacted by the accelerating feet 90 at substantially zero forward velocity, are picked up and smoothly accelerated into forward motion.

During the cradle travel about the loading sprocket 38, the roller on arm 66 engages a jaw opener cam 67 thereby raising arm 66 to open the gripper jaws 65 as above-described, and after a projectile has been embraced, the cam contour moves arm 66 downwardly to close the jaws.

It will be observed in Figs. 1 and 2 that as cradles round the sprockets the side arms 51—52 and 51a—52a by telescoping readily accommodate themselves to the changes in rectilinear distances between the forward and rear connections 56, 56a and 57. Thus, as the cradles progress around the pickup sprocket 38, which is of relatively small diameter, the cradle side arms are almost completely telescoped and only the forward connection 56 travels in a horizontal direction at chain speed while the rear connection 57 and the accelerating feet 90 have a downward and a slightly rearward movement due to the relative location of the idler sprocket 37 and pickup sprocket 38. As the cradle foot descends substantially normal to the longitudinal axis of the projectile 100, the forward connection 56 moves ahead, extending the side bars. As the rear cradle connection 57 rounds the pickup sprocket 38 the accelerating feet 90 commence to move forwardly, and when the rear connection 57 leaves sprocket 38 the cradle side arms are fully extended and both the cradle and projectile are moving forward at chain speed.

As shown in the series of instantaneous views of Fig. 3, the projectile travels upwardly, with the nose thereof passing between the pair of spaced idler sprockets 32 and between the pair of drive sprocket 33 until it reaches the launching sprocket 34 at which time the projectile is in alignment with the gun breech 21. As the front end of the cradle rises around the ramming sprocket 34 the lower ends of the accelerating feet 90 move a relatively greater distance forward compared with chain travel. This accelerates the projectile in a tangential course since substantially simultaneously the arm 66 is engaged by cam 68 to open the gripper jaws and the projectile is catapulted towards and into the gun breech 21 at a speed higher than that of the conveyor chain. If desired, a suitable loading tray (not shown) may be provided to aid in guiding the projectile into the breech.

Since the driving and launching sprockets 33 and 34 are mounted on the elevating portion of the gun, their positions relative to each other and with respect to the breech remain fixed and hence the projectile is always accurately delivered into the breech irrespective of the movement of the gun in elevation.

It will be noted that the conveyor will travel at a constant speed relative to the gun breech even though the latter is simultaneously moving rapidly in elevation during conveyor operation. Since the conveyor drive sprockets 33 are mounted upon the gun breech and move therewith, the up and down elevation movement is added to and separated from the absolute chain speed. It will be apparent that the maximum and minimum conveyor speeds obtained under this arrangement must be such that the conveyor maximum speed does not exceed that at which the cradle can safely pick up the projectiles and yet the speed at which the projectile is catapulted into the gun will always be constant.

If desired, the drive motor 44 need not be located on the elevating portion of the gun (or the movable delivery station when the conveyor is used for other purposes) and suitable speed compensating means may be provided to keep the conveyor speed constant even though the delivery point moves. If the delivery station is fixed and not movable then of course it would be immaterial which of the pairs of sprocket wheels were utilized as a conveyor drive.

It will be apparent that only one embodiment of the present invention has been shown and described. Many variations or modifications in the arrangement of the parts of the invention may be made without departing from the scope and spirit of the appended claims.

What is claimed is:

1. A device for transferring objects of elongated shape from a loading station to a delivery station which may move during transfer of the objects comprising; a pair of spaced endless parallel conveyor bands, a plurality of pairs of spaced guide wheels supporting the bands for continuous movement between the loading station and the delivery station, drive means for moving the bands past the delivery station at a substantially constant speed, one of the pairs of guide wheels being disposed adjacent the loading station to change the direction of movement of the conveyor from a path converging with the longitudinal axis of an object to be picked up to a path substantially parallel to said longitudinal axis, another of the pairs of guide wheels at the delivery station to change the direction of movement of the bands from a path substantially aligned with the delivery station to a path diverging therefrom, an object engaging cradle including spaced side arms thereon, each side arm being pivotally connected forward and rear to a respective band, the side arms being contractible and extensible to automatically adjust themselves to changes in rectilinear distance between the pivotal connections as the cradles round the guide wheels at the loading station, gripper jaws on the cradle, and cam means at the loading station to operate the gripper jaws to cause them to grasp an object and pick it up.

2. A device for transferring objects from a loading station to a delivery station comprising; an endless parallel conveyor band, a plurality of spaced guide wheels supporting the band for continuous movement between the loading station and the delivery station, drive means for moving the band at a substantially constant speed, one of the guide wheels being disposed adjacent the loading station to change the direction of movement of the conveyor from a path converging with the longitudinal axis of an object to be picked up to a path substantially parallel to said longitudinal axis, a second guide wheel at the delivery station to change the direction of movement of the band from a path substantially aligned with the delivery station to a path diverging therefrom, an object engaging cradle having spaced side arms, each side arm being pivotally connected forward and rear to the band, the side arms being contractible and extensible to automatically adjust themselves to changes in rectilinear distance between the pivotal connections as the cradles round the guide wheels at the loading station whereby when the afterend of the cardle reaches the loading station it is at substantially zero velocity, gripper jaws on the after end portion of the cradle, and means at the loading station to operate the gripper jaws to cause them to grasp an object and pick it up.

3. A device for transferring objects from a loading station to a delivery station comprising; a conveyor including a pair of spaced endless parallel bands, a plurailty of guide wheels supporting the bands for side by side movement around a continuous circuit between a loading station and a delivery station, drive means for moving the bands at a substantially constant speed, one of the guide wheels being disposed adjacent the loading station to change the direction of movement of the conveyor from a direction converging with an axis of an object to be picked up to a direction substantially parallel to said axis, a second guide wheel at the delivery station to change the direction of movement of the conveyor from a path substantially aligned with the delivery station to a path diverging therefrom, an object carrying cradle, spaced side bars on the cradle, each side bar being pivotally connected forward and rear to a respective parallel band so that the cradle is slung therebetween, the side bars being contractible and extensible to allow for changes in rectilinear distance between the pivotal connections as the cradles round the guide wheel of the loading station and the guide wheel at the delivery station, gripper jaws on the cradle, and means at the loading station to operate the gripper jaws to cause them to grasp an object.

4. A device for conveying objects comprising an endless conveyor band, a plurality of guide wheels for supporting and guiding the conveyor band, a cradle with a support in the form of an arm pivotally secured at opposite ends to the conveyor band, said arm forwardly of the cradle being contractible and extensible to accommodate changes in rectilinear distance as the band rounds the guide wheels, one of the guide wheels being adjacent an object pickup station to change the direction of band movement from a path at an angle to the axis of the object to a path substantially parallel therewith, object engaging jaws on the cradle, and means for closing the cradle jaws about the object at the pickup station as the change of direction occurs, whereby during engagement of the cradle with the object the cradle is moving at a reduced speed relative to the speed of movement of the band.

5. A device for conveying objects comprising a pair of spaced parallel endless conveyor bands, guide wheels for supporting and guiding the conveyor bands along parallel paths, a cradle carried between the bands by spaced elongated side arms each being pivotally secured at opposite ends to one of the respective conveyor bands, said side arms being contractible and expansible forwardly of the cradle object gripping jaws on the cradle, guide means in the proximity of an object pickup station to change the direction of band movement from a path at an angle to the axis of the object to a path substantially parallel therewith, and means for closing the jaws about the object at the pickup station as the change in direction is completed.

6. A continuously operating constant speed conveyor comprising; a pair of spaced parallel endless bands, a plurality of cradles supported by the bands, a pair of spaced elongated retractible support arms on the cradles each pivotally secured at opposite ends to an adjacent band, object gripping jaws depending from the cradles, a foot at the rear of each cradle engageable with the after end of the object, guide wheels in the proximity of an object pickup station to change the path of band movement from converging with the axis of an object to substantially parallel to said axis, and means for closing the jaws about the object substantially simultaneously with contact of the foot therewith.

7. A conveyor comprising a pair of spaced parallel endless conveyor bands, a plurality of pairs of guide wheels for supporting and guiding the conveyor bands, a cradle having a pair of telescoping side bars each being pivotally secured at opposite ends to one of the conveyor bands, object gripping jaws on the cradle, a foot extending outwardly from the rear of the cradle for abutting the end of an object, guide means in the proximity of an object pickup station to change the direction of band movement from a path substantially perpendicular to the axis of an object to a path substantially parallel therewith, and means for closing the jaws about an object at the pickup station.

References Cited in the file of this patent

UNITED STATES PATENTS

| 599,568 | Lewis | Feb. 22, 1898 |
| 1,138,149 | Reichard | May 4, 1915 |
| 1,282,462 | Ricks | Oct. 22, 1918 |
| 1,371,738 | Dawson et al. | Mar. 15, 1921 |
| 2,403,887 | Tweedale | July 9, 1946 |

FOREIGN PATENTS

| 674,852 | France | Oct. 28, 1929 |